United States Patent [19]

Foote et al.

[11] Patent Number: 5,314,402

[45] Date of Patent: May 24, 1994

[54] AIRCRAFT AIRCREW LIFE SUPPORT SYSTEMS

[75] Inventors: James C. Foote; Michael W. Harral; Peter J. Rowland, all of Yeovil, England

[73] Assignee: Normalair-Garrett (Holdings) Limited, England

[21] Appl. No.: 713,103

[22] Filed: Jun. 11, 1991

[30] Foreign Application Priority Data

Jun. 19, 1990 [GB] United Kingdom ............... 9013630

[51] Int. Cl.⁵ .......................................... B64D 10/00
[52] U.S. Cl. ...................................... 600/20; 600/19
[58] Field of Search ............... 600/19, 20; 128/202.11

[56] References Cited

U.S. PATENT DOCUMENTS

| | | | |
|---|---|---|---|
| 3,672,384 | 6/1972 | Hellquist | 128/202.11 X |
| 3,734,078 | 5/1973 | Cramer et al. | 600/19 |
| 3,780,723 | 12/1973 | Van Patten et al. | 600/19 |
| 4,230,097 | 10/1980 | Beaussant et al. | 600/19 |
| 4,534,338 | 8/1985 | Grosbie et al. | 600/19 |
| 4,638,791 | 1/1987 | Krogh et al. | 600/19 |
| 4,906,990 | 3/1990 | Robinson | 600/20 |
| 5,127,896 | 7/1992 | de Gaston | 600/20 |

FOREIGN PATENT DOCUMENTS

| | | |
|---|---|---|
| 0263677 | 4/1988 | European Pat. Off. |
| 0419183A1 | 3/1991 | European Pat. Off. |
| 2051417A | 1/1981 | United Kingdom. |

*Primary Examiner*—Lee S. Cohen
*Assistant Examiner*—Jeffrey R. Jastrzab
*Attorney, Agent, or Firm*—Larson & Taylor

[57] ABSTRACT

Inflation pressure of an aircrew G-suit is set by a servo-pressure which controls movement of inflation gas supply and vent valves 126 and 127, respectively. Servo-pressure is regulated by a torque motor controlled valve 124, 125 which receives a servo-demand signal from an electronic control unit (ECU) 123. The ECU receives an inflation pressure demand signal $P_{DEM}$ from an aircraft systems computer 120 which stores schedules of G-suit inflation pressure against increasing acceleration and decreasing cabin ambient pressure. The computer is programmed to look-up and output the higher one of values for inflation pressure dependent upon values of acceleration signals $G_Z$ and cabin ambient pressure signals $P_{AMB}$ input to the computer by sensors 121 and 122, respectively. The ECU compares an existing G-suit inflation pressure $P_O$ signal with the inflation pressure demand signal and generates a compensated error signal which is combined with the inflation pressure demand signal to provide the servo-demand signal. The use of the ECU for the computationally intensive control task optimizes the use of the aircraft system computer. A combined breathing demand regulator and G-suit inflation pressure control valve which continues to function in the absence of electrical power after bail-out from an aircraft is also disclosed.

8 Claims, 4 Drawing Sheets

AIRCRAFT AIRCREW LIFE SUPPORT SYSTEMS

BACKGROUND OF THE INVENTION

1. Field of the Invention

THIS INVENTION relates to aircraft aircrew life support systems and is particularly concerned with integrated breathing demand regulator and garment inflation pressure control systems.

2. Description of the Prior Art

The enhanced agility of modern high performance aircraft designs give such aircraft the ability to perform very highly accelerative manoeuvres both at low altitude and at high altitudes, e.g. in excess of 12000 meters (40000 ft). To take advantage of this agility an aircrew member flying the aircraft must be protected against G-induced loss of consciousness, known as G-loc, as well as the effect of exposure to high altitude in the event of loss of cabin pressure. In this regard, unless otherwise specified, references to altitude are to be understood as references to the altitude equivalent to the pressure within an enclosure or cabin within which an aircrew member is situated and which is usually pressurised in relation to the external ambient pressure with the consequence that "cabin altitude" is related to but usually less than the actual altitude of the aircraft.

The partial pressure of oxygen in air decreases with increasing altitude (decreasing total pressure) so that the concentration of oxygen in breathing gas supplied to the aircraft aircrew member must be increased with increasing cabin altitude to maintain the oxygen partial pressure above the minimum value necessary for it to be able to diffuse through the lung tissue and pass to the haemoglobin or red corpuscles in the blood. If, at aircraft operating altitudes above 12000 meters, there is total or partial loss of cabin pressure which causes cabin pressure to fall below 12000 meters equivalent pressure then the overall pressure of the breathing gas delivered to the aircrew member must be increased to a value above cabin ambient pressure so that the minima critical oxygen pressure is maintained in the lungs, this being referred to as positive pressure breathing (PPB).

Positive pressure breathing at high altitude is aided by exerting pressure around the chest to give support and to assist the aircrew member in exhaling used gas from his lungs against the positive pressure in his breathing mask and to enable breathing to be sustained until the aircraft has descended to 12000 meters or below. To meet this requirement the aircrew member wears an inflatable counter-pressure garment ("jerkin") around his chest and back area which is inflated to the same pressure as the pressure in the breathing mask during positive pressure breathing, conveniently by being connected for inflation by breathing gas delivered to the breathing mask.

To counter the effects of high G-load the aircrew member wears an inflatable G-protection trouser garment ("G-suit") which is inflated from a source of high pressure gas, such as engine bleed air. Inflation of the trouser garment may be in response to signals from one or more accelerometers located in the aircraft for sensing accelerative forces, or in response to movement of an inertia mass provided as part of an inflation control valve assembly. When inflated, the trouser garment restricts the flow of blood into the lower extremities of the body where it tends to be forced under the action of the G-load to which the aircrew member is subjected.

It has been found that protection against G-loc is further enhanced by providing positive pressure breathing during periods when high G-loads are being experienced. The increase in breathing pressure causes an approximately equal increase in heart level blood pressure thereby increasing the flow of blood to the brain.

On exposure to altitudes which demand positive pressure breathing it is advantageous to inflate the trouser garment to a pressure three to four times that of the pressure in the breathing mask even at times when aircraft flight manoeuvres are not such as to give rise to high G-load. This inflation of the trouser garment counteracts the tendency for blood to be forced into the lower extremities of the body by the high pressure in the lungs and by the counter-pressure garment, which reduces the circulation of blood from the heart to the brain. However, when both altitude and G-load conditions give rise to a requirement for positive pressure breathing, the trouser garment should be inflated to a pressure appropriate to the higher of the prevailing G-load or altitude signals.

It is common practice now to provide oxygen-enriched air as breathing gas for an aircrew member of a high performance aircraft from an on-board oxygen generating system (OBOGS) which includes molecular sieve beds comprising zeolite material suited to the retention of nitrogen whilst permitting oxygen to pass through the beds.

A problem with respect to demand valve operation in a breathing regulator suitable for accommodating the lower range of breathing gas pressure available from an OBOGS is overcome by a breathing regulator disclosed in EP-A-0,263,677 (Normalair-Garrett) which provides positive pressure breathing when the cabin altitude exceeds 12000 meters and, also, when high G-loads are being experienced. Above 12000 meters cabin altitude, an aneroid valve expands to increasingly restrict the flow of gas from a breathing-pressure control chamber so that pressure in this control chamber increases thereby increasing the pressure of the breathing gas at the regulator outlet to which both breathing mask and counter-pressure garment or jerkin are connected.

When the aircrew member is subjected to high G-loads, i.e. between 3.5 G and 9 G a further valve regulating outflow from the breathing-pressure control chamber is signalled pneumatically by an anti-G valve to move towards increasingly restricting outflow of gas from the breathing-pressure control chamber so that pressure in that chamber increases to provide (increased) positive pressure breathing in the event that the cabin altitude is below that at which the same degree of positive pressure breathing would be provided. The anti-G valve is an electro-pneumo-mechanical device that controls a supply of inflation air to the G-suit in accordance with sensed G-loads and the signal to the further valve of the demand regulator is obtained by tapping the inflation air line from the anti-G valve to the G-suit.

Further disclosures of aircraft aircrew life support systems and apparatus which control inflation of a G-suit worn by the aircrew member and regulate delivery of breathing gas in accordance with the breathing demand of the aircrew member are to be found in U.S. Pat. No. 4,230,097 (Intertechnique), U.S. Pat. No. 4,638,791 (Boeing) and GB-A-2,051,417 (Intertechnique), this last disclosing a unitary or integrated breathing demand regulator and G-suit inflation control valve in which, however, the demand regulator and the control valve are functionally separate.

These prior art systems (other than EP-A-0,263,677) treat breathing gas and jerkin pressure requirements and G-suit inflation pressure requirements as separate functions to be provided by individual sub-systems integrated, functionally, only to the extent of sharing input data (such as anticipated and/or realised G-loads) output from a common source.

A system having greater functional integration of such sub-systems to provide better control and coordination of their respective functions and, especially to provide optimised responses to abrupt change in aircraft flight conditions, is disclosed in EP-A-0 419 183 (Normalair Garrett).

This system comprises G-suit inflation control means and breathing demand regulator means disposed in a common housing. The G-suit inflation control means comprises a spool valve which is moved in an opening direction by a pneumatic actuator to allow inflation gas to flow to the G-suit, and a diaphragm mounted vent valve biased by a spring towards opening a vent port for deflation of the G-suit. An electronically controlled torque motor controls a valve member for regulation of a servo-pressure which acts to cause the pneumatic actuator to move the spool valve to an open position and to move the vent valve to close the vent port. The torque motor is signalled by a self-contained electronic control unit which receives and processes acceleration signals and cabin pressure signals. The control loop is closed by a feedback signal from a pressure transducer which senses G-suit inflation pressure.

Whilst certain advantages are offered by use of a self-contained electronic control unit dedicated to control of G-suit inflation, there are penalties in terms of cost, space and weight, because the design of the unit is complicated by the need to perform scheduling tasks.

A solution in an aircraft having an on-board utilities system computer is to use that computer to perform the control functions for the G-suit inflation control means. Whilst this would totally replace the dedicated electronic control unit and, possibly, provide the smallest, lightest package, a major disadvantage is that valve performance is directly limited by the update rate of the computer. Also, it may be considered inappropriate to use the computer to perform a computationally intensive control task which could more easily be satisfied by dedicated analogue electronics.

There is now a requirement in some high performance aircraft for the G-suit to be inflated to the higher of pressure requirements for protection against G-load and exposure to altitude above 12000 meters as might occur if the aircraft suffered a cabin decompression above such altitude when flying a highly accelerative manoeuvre. It is a further requirement that the G-suit be inflated to a pressure of three to four times breathing gas pressure in the event that the aircrew member has to eject from the aircraft above 12000 meters altitude.

Whilst the first mentioned requirement can be met by suitable software in the electronic control unit of the system disclosed in EP-A-0 419 183, there is no provision for continued functioning of the unit and the G-suit inflation control means when electrical power is lost following ejection from the aircraft, to give protection against exposure to altitude.

SUMMARY OF THE INVENTION

It is an object of the present invention to provide a method of controlling G-suit inflation pressure which optimises the use of aircraft on-board computing facilities for control functions.

It is another object of the present invention to provide an aircraft aircrew life support system having a high rate of response in enhancing protection of the aircrew member when exposed to rapidly increasing or high G-load and/or to high aircraft ambient altitude, and which controls inflation of an aircrew G-suit to the higher of pressure requirements for protection against G-load and exposure to high aircraft ambient altitude.

Accordingly, one aspect of the invention provides a method of controlling inflation pressure of an aircrew G-protection trouser garment (G-suit) in protecting an aircrew member against G-load and/or exposure to altitude above a predetermined level, comprising the steps of:

storing in an aircraft on-board systems computer a schedule of G-suit inflation pressure against increasing acceleration along the vertical axis of the aircraft and a schedule of G-suit inflation pressure against decreasing cabin ambient pressure (increasing cabin altitude);

inputting to the computer signals representative of acceleration sensed along the vertical axis of the aircraft and signals representative of cabin ambient pressure;

looking-up in the schedules and presenting requirements for G-suit inflation pressure;

determining by control logic programmed in the computer a higher one of values for G-suit inflation pressure in the event of simultaneous acceleration and cabin ambient pressure signal inputs requiring inflation of the G-suit;

generating in the computer a G-suit inflation pressure demand signal;

transmitting the G-suit inflation pressure demand signal to an electronic control unit (ECU) dedicated to control of G-suit inflation control valve means;

sensing pressure existing in the G-suit or a pressure substantially corresponding thereto;

feeding back to the ECU a signal representative of existing G-suit pressure;

comparing the existing G-suit pressure signal with the G-suit inflation pressure demand signal;

generating a compensated error signal;

combining the compensated error signal with the G-suit inflation pressure demand signal to provide a servo-demand signal;

transmitting the servo-demand signal to servo-control valve means for regulation of a servo-pressure which acts to move G-suit inflation gas supply valve means towards an open position and G-suit vent valve means towards a closed position.

The control method of the present invention optimises the use of the aircraft systems computer by using a dedicated ECU package for more computationally intensive tasks.

The control method of the present invention may further comprise the step of generating negative value pressure demand signals in the computer at low levels of acceleration and transmitting the negative value pressure demand signals to the ECU so that the G-suit is not inflated until a predetermined G-level is exceeded.

To sense pressure existing internally of the G-suit a pressure sensor may be provided as part of the G-suit; however, this requires that the aircrew member make an additional connection or disconnection when entering or exiting the aircraft. For this reason it is preferred to sense pressure in an outlet from the inflation control valve means to the G-suit, such pressure being the same as G-suit pressure in steady state conditions and substantially the same as G-suit pressure in fluid flow conditions.

In another aspect the present invention provides an aircraft aircrew life support system comprising a breathing demand regulator means adapted to be connected with a breathing gas source for regulating supply of breathing gas to a breathing mask in response to breathing demands of the aircrew member, and, if required, to a counter pressure garment; G-protection garment (G-suit) inflation control means comprising servo-control valve means for regulating a servo-pressure for control of a G-suit inflation gas supply valve means controlling flow of high pressure gas from inlet means adapted for connection with a source of said gas to outlet means adapted for connection with said G-suit and for control of a G-suit inflation gas vent valve means; means for sensing acceleration along a vertical axis of said aircraft and for outputting signals representative thereof; means for sensing pressure internal of an aircraft cabin and for outputting signals representative thereof; an aircraft on-board systems computer having a memory storing schedules of G-suit inflation pressure against increasing acceleration along the aircraft vertical axis and against decreasing aircraft cabin pressure and connected for receiving signals from said acceleration sensing means and from said cabin pressure sensing means, said computer being programmed to look-up in said schedules and present values of G-suit inflation pressure appropriate to sensed acceleration and cabin pressure and being further programmed with logic for determining a higher one of values for inflation pressure in the event of simultaneous acceleration and cabin pressure inputs requiring inflation of the G-suit, said computer being adapted for generating a G-suit inflation pressure demand signal; an electronic control unit (ECU) connected for receiving said G-suit inflation pressure demand signal from said computer; means for sensing pressure existing in said G-suit or a pressure substantially corresponding thereto and connected for transmitting a feedback signal representative of existing G-suit pressure to said ECU; said ECU including means for comparing said existing G-suit pressure signal with said demand signal, means for generating a compensated error signal, and means for combining said compensated error signal with said demand signal to provide a servo-demand signal; said ECU being connected for transmitting said servo-demand signal to said servo-control valve means for regulation of the servo-pressure whereby the G-suit inflation pressure is adjusted towards the required value.

For the comfort of an aircrew member when operating at low levels of G-load it is generally required that the G-suit is uninflated until a given level of acceleration is reached, typically 2 G, and that at this level the system be immediately responsive to inflate the G-suit to a first pressure.

In a system in accordance with a preferred embodiment of the present invention this requirement is met by programing the computer to output negative value pressure demand signals to the ECU at levels below 2 G, and the ECU includes means which reject negative value pressure demand signals so that they are ineffective to produce a G-suit inflation demand signal.

In this preferred system the ECU includes a negative value rejection circuit, first and second summing circuits, a pulse width modulation circuit and a torque motor drive circuit. Positive value pressure demand signals are input to both the first and second summing circuits. At the first summing circuit the positive value demand signal is summed with a G-suit inflation pressure feedback signal and an error signal is output. After being compensated to enhance its accuracy and stability this error signal is passed to the second summing circuit for summing with the positive value demand signal and an offset signal. The second summing circuit outputs a servo-demand signal which is applied to the pulse width modulation circuit for control of servo-control valve drive means. Negative value pressure demand signals are excluded by the negative value rejection circuit from passing to the first summing circuit but are passed to the second summing circuit for sunning with an offset signal in obtainment of a servo-demand signal that sets a servo-pressure which is marginally below that required for commencement of control of G-suit inflation gas supply and vent valves.

The breathing demand regulator preferably includes a breathing pressure control chamber fed with gas to develop a control pressure therein determining the breathing gas pressure delivered by the regulator.

The servo-control valve means preferably comprises a torque motor-controlled valve means for regulating a servo-flow to provide servo-pressure which acts to move the G-suit vent valve means towards a closed position and the inflation gas supply valve means towards an open position whereby inflation gas flows from the inlet to the outlet, the torque motor-controlled valve means being biased in absence of electrical power to close a vent means communicating servo-flow with ambient, and a solenoid operated valve means biased in absence of electrical power to a position communicating servo-flow with one side of a valve means adapted for sensing on its opposite side pressure in the breathing pressure control chamber whereby servo-pressure is regulated to set a G-suit inflation pressure that is a predetermined multiple of breathing gas delivery pressure.

Typically, the G-suit inflation pressure will be set to be between three and four times breathing gas delivery pressure in the absence of electrical power.

BRIEF DESCRIPTION OF THE DRAWINGS

The invention will now be further described by way of example with reference to the accompanying drawings in which.

DETAILED DESCRIPTION OF THE DRAWINGS

Figure 1:
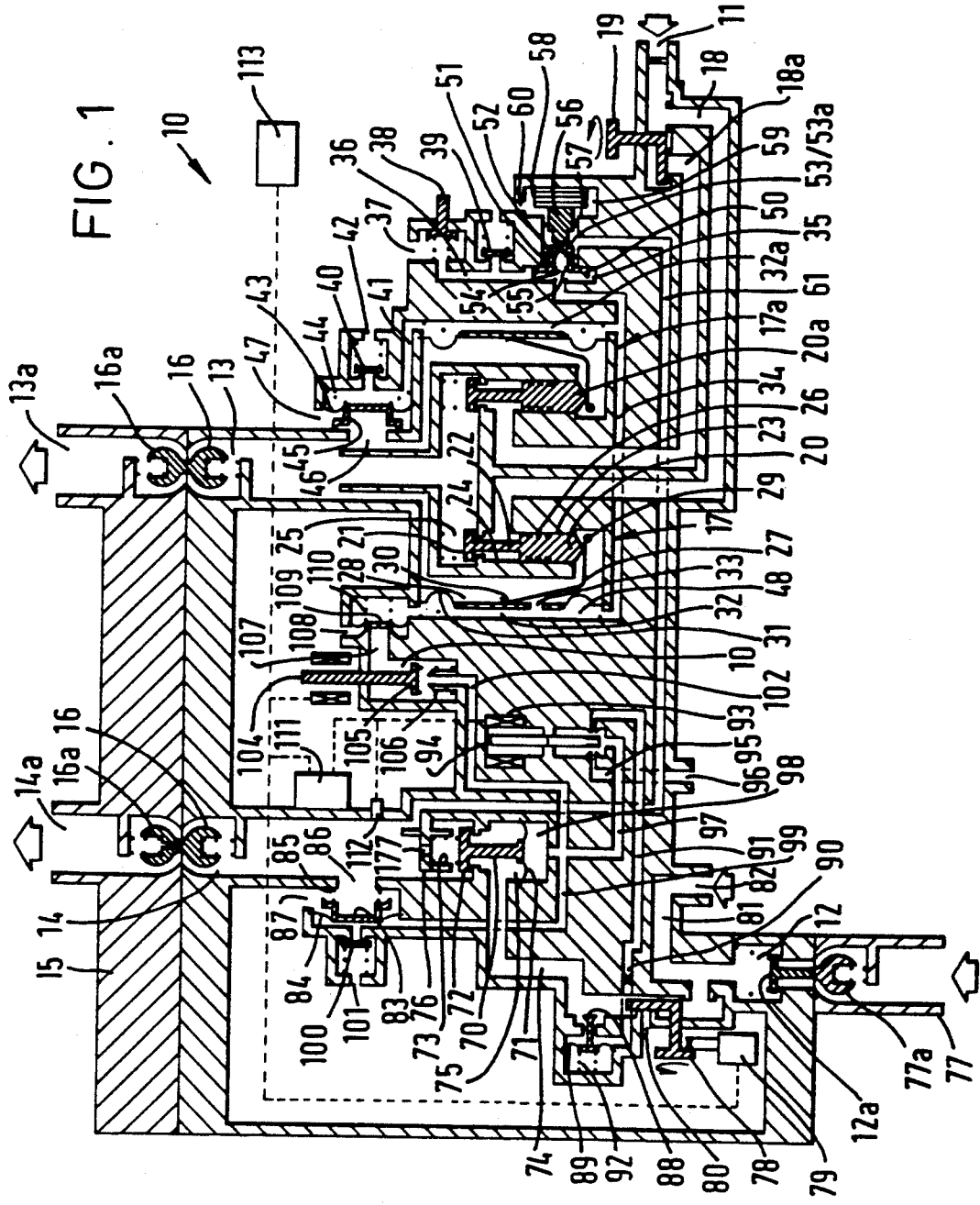
FIG. 1 is a diagramatic illustration of breathing demand regulator and inflation control apparatus in accordance with one embodiment of the invention.

FIG. 1 of the drawings illustrates diagramatically combined breathing demand regulator and G-protection trouser garment ("G-suit") inflation control apparatus in the form of a single seat-mountable unit 10 having a breathing gas inlet 11 and a G-suit inflation gas inlet 12, and outlets 13 and 14 for breathing gas and inflation gas, respectively, adapted for connection with corresponding inlets 13a, 14a of a personal equipment connector 15. The actual construction of the cooperating parts of the unit 10 and personal equipment connector 15 are not detailed in FIG. 1 because they conform with existing standards. For instance, as is customary, the outlets 13, 14 and inlets 13a, 14a incorporate self-sealing valve arrangements 16, 16a, respectively, that provide open communication through the outlets and complementary inlets when the connector 15 is attached to the unit 10, but which close to seal off the outlets and inlets upon detachment of the connector 15 from the unit. The cooperating parts of the unit 10 and connector 15 include provision for coupling communications and other services (not shown), such as de-misting air supplies, on the aircraft to the aircrew member and his personal equipment. The connector 15 may also include a suitable tapping (not shown) from the inlet 13a for connection to a chest counter-pressure garment ("jerkin") to provide for inflation of this by breathing gas to assist exhalation during positive pressure breathing or, alternatively, this connection may be taken directly from a breathing hose (not shown) extending between the inlet 13a and a breathing mask (not shown).

The breathing gas inlet is adapted to receive oxygen-enriched air from a source of breathing gas such as, for example, a molecular sieve oxygen concentrator system (not shown). Flow of oxygen-enriched air to the breathing gas outlet 13 is controlled by a demand-regulator arrangement comprising a main regulator 17 and a standby regulator 17a for use, for example, in the event of malfunction of the main regulator. Breathing gas from the inlet 11 flows to the main regulator by way of an inlet passageway 18 and to the standby regulator by way of an inlet passageway 18a, a selector valve 19 being provided for communicating one or the other of the inlet passageways 18, 18a with the breathing gas inlet 11. As the major components of the regulators 17, 17a are of the same design only the main regulator is here described in detail.

The main regulator 17 comprises a demand valve 20 having a valve head 21 supported by a spindle 22 from a spool 23 that slides in a bore 24 in the body of the unit 10. The valve head 21 is urged towards a closing position by a compression spring 25 acting on the valve head. Means such as an adjustment screw (not shown) may be provided for adjusting the thrust of the spring on the valve head. The opposed surfaces of the valve head 21 and the spool 23 are equal so that the valve 20 is balanced by the pressure of the oxygen-enriched air in the inlet passageway 18. The spool 23 is provided on its circumferential surface with grooves 26 in the manner of a labyrinth seal. The end surface of the spool opposite the end surface from which the spindle 22 projects is of conical form and projects from the bore 24 into contact with a valve operating lever 27 housed in a demand-pressure sensing chamber 28 and arranged to pivot about one of its ends 29. The other end 30 of the lever 27 bears on the centre of a diaphragm 31 that divides the demand-pressure sensing chamber 28 from a breathing-pressure control chamber 32.

The demand-pressure sensing chamber 28 is arranged to be open to pressure at the outlet 13 whilst the breathing-pressure control chamber 32 is arranged to receive a bleed of oxygen-enriched air from the demand-pressure sensing chamber through an orifice 33 in the diaphragm 31. The breathing-pressure control chamber 32 is arranged to be open to aircraft cabin pressure by way of a passageway 34, a chamber 35, a passageway 36 and an outlet 37. A press-to-test valve 38 and a press-to-test relief valve 39 are incorporated in the passageway 36. A valve arrangement provided with the chamber 35 and hereinafter described in detail, controls outflow of gas from the breathing-pressure control chamber 32 to the aircraft cabin in obtainment of a pressure in the breathing-pressure control chamber appropriate to providing positive pressure breathing at cabin altitudes above 12000 meters or in the presence of high G-loads.

A maximum pressure relief valve 40 provides for venting of excess pressure from the breathing-pressure control chamber 32, via the passageway 34 and the breathing pressure control chamber 32a of the standby regulator 17a via a passageway 41 to a secondary outlet 42 to the aircraft cabin.

Pressure in the breathing-pressure control chamber 32 is applied, by way of passageway 41, to one side of a diaphragm 43 that together with a spring 44 acts to urge a valve head 45 carried by the diaphragm 43 towards closing communication between a vent port 46 in the outlet 13 and a secondary outlet 47 to the aircraft cabin and that enables oxygen-enriched air in the outlet 13 to be vented to aircraft cabin.

The valve head 45 is arranged to open when the pressure in the outlet 13 is a prescribed amount higher than that in the breathing-pressure control chamber 47. Typically, the pressure differential required to open this pressure relief valve arrangement is 950 Pa (3.8 inches WG).

The diaphragm 31 is backed by a spring 48 located in the breathing-pressure control chamber 32. This spring acts on the diaphragm to urge it into contact with the lever 27 and the arrangement is such that the force balance of the springs 25 and 48 acting on the diaphragm 31 and demand valve 20 provides a null position for the diaphragm in which the valve head 21 is held off its seat sufficiently to maintain, in operation, a positive (safety) pressure of, say, 375 Pa (1.5 inch WG) in the outlet 13. Means (not shown) may be provided to negate the effort of spring 48 when the regulator is out of use, to prevent wastage of oxygen-enriched air by permitting the valve head 21 to close under the influence of spring 25.

As thus far described the main regulator 17 conforms in principle to the demand regulator described in EP-A-0,263,677, and functions in similar manner. That is, with oxygen-enriched air available at the inlet 11 and the selector valve 19 switched to connect the inlet 11 with inlet passageway 18, the demand valve 20 responds by movement of the diaphragm 31 to phases of the breathing of an aircrew member wearing a mask attached to the outlet 13 via the connector 15. Breathing cycle pressure exists in the outlet 13 and thus in the demand-pressure sensing chamber 28, being sensed by the diaphragm. This moves to the right, as seen in the drawings, during inhalation so as to cause opening movement of the valve 20, whereas exhalation causes the diaphragm to move to the left to permit the valve 20 to close.

In this embodiment, however, the standby regulator 17a is provided. With the selector valve switched to connect the inlet 11 with the passageway 18 breathing cycle pressure will exist in the demand-pressure sensing chamber of the standby regulator 17a because of its connection with the outlet 13. Also, control pressure will exist in the breathing-pressure control chamber 32a because of its connection with the passageway 34. However, the standby regulator will not function to deliver oxygen-enriched air because there is no supply to its demand valve 20a. In the event of malfunction of the main regulator 17 the aircrew member switches the selector valve 19 to connect the inlet 11 with the passageway 18a so that oxygen-enriched air is delivered to the demand valve 20a and the standby regulator 17a then operates in the manner previously described with reference to the main regulator 17 but at a higher safety pressure of, say, 750 Pa (3.0 inches WG).

An improved feature introduced into the demand regulator arrangement by the present invention is the valve arrangement provided with the chamber 35. This valve arrangement comprises a valve head 50 located in the chamber 35 and carried by a stem 51 which is supported by a diaphragm 52 from the body of the unit 10. At an opposite end face 53 of the stem 51 a valve seat 53a is provided and a bore 54 extends through the stem between the valve seat 53a and the valve head 50. The valve head 50 is urged towards communicating the passageway 34 with the chamber 35 by a spring 55. A loading member 56 supported by a diaphragm 57 is urged by expansion of an aneroid capsule 58 towards closing with the valve seat 53a. The aneroid capsule 58 is located in a chamber 59 which is open to aircraft cabin pressure by way of a port 60. The end face 53 of the stem 51 is communicated with pressure in the G-suit inflation gas outlet 14 by way of a passageway 61 which extends between the outlet 14 and the back face 53.

In operation of the breathing demand regulator, when the aircraft is flying highly accelerative manoeuvres which subject the aircrew member to G-load, G-suit inflation pressure present in the outlet 14, as will hereinafter be described, is sensed on the end face 53 of the stem 51 by way of the passageway 61. This pressure acts to move the valve-head 50 towards increasing the restriction to outflow from the breathing-pressure control chamber 32 to the outlet 37 to the aircraft cabin. This causes pressure in the chamber 32 to rise and increase the net pressure loading of the diaphragm 31 and correspondingly the pressure in the outlet 13 and chamber 28. The demand valve 20 thus tends to maintain an increased pressure in the outlet 13 and, hence, in the breathing mask of the aircrew member. The increase in pressure in chamber 32 is also applied to the diaphragm 43 of the relief valve arrangement. By choice of the ratio of stem area 51 and head area 50 the required schedule of breathing pressure versus G-suit pressure may be obtained.

In similar manner, in the event of the cabin altitude rising above 12000 meters the aneroid capsule 58 expands to move the valve head 50 towards increasing the restriction to outflow from the chamber 32 to the outlet 37 and so result in a raising of the breathing gas pressure at outlet 13 thereby to maintain a physiologically acceptable level of oxygen partial pressure in the breathing gas supplied to the aircrew member during flight at cabin altitudes in excess of 12000 meters.

If a highly accelerative manoeuvre is flown with the cabin altitude in excess of 12000 meters, G-suit inflation pressure at outlet 14 is applied to the end face 53 of valve stem 51 and if this is such as to require an increase in breathing gas pressure over that set by expansion of the aneroid capsule 58, the valve head 50 is moved to further increase the restriction to outflow from the chamber 32 and, hence further increase the breathing gas pressure at outlet 13. However, in the event that cabin altitude is the higher of the two requirements the pressure on the end face 53 is ineffective. Thus, it will be appreciated that pressure in control chamber 32 and, hence, breathing gas pressure at outlet 13, is set by the higher of the requirements for protection against the effects of altitude and G-load when the aircraft performs manoeuvres giving rise to G-load at altitudes in excess of 12000 meters.

For the reasons explained in EP-A-0,263,677, the bore 54 in the stem 51 provides a supplemental control flow function effective to counteract the effects of sudden changes in G-load.

The unit 10 additionally comprises G-suit inflation control means that includes an inflation gas supply valve member 70 supported by a diaphragm 71 and having a valve head 72 biased by a spring 73 towards closing communication between the G-suit inflation gas outlet 14 and an inflation gas supply passageway 74 that extends from the inflation gas inlet 12 to a chamber 75 defined between the back face of the valve head 72 and the diaphragm 71. The spring 73 is housed in a cylindrical cup member 76 supported from the body of the unit 10. A drilling 177 is provided in the closed end of the cup member 76 whereby pressure in the outlet 14 may be sensed internally of the cup member and hence be fed back to the valve head 72 as it closes with the cup member.

An inflation gas supply line 77 communicating with a source of pressurised gas such as, for example, pressurised air for the aircraft environmental control system derived from an engine compressor stage, is connected with the inlet 12. The construction of the cooperating parts of the supply line 77 and inlet 12 are not detailed in FIG. 1 because they conform with existing standards. As is customary, the inlet 12 and the supply line 77 incorporate self-sealing valve arrangements 12a and 77a, respectively, which cooperate to provide open communication when the supply line 77 is attached to the unit 10, but which close to seal off the supply line and the inlet upon detachment of the supply line. A shut-off valve 78 is provided for closing communication between the inlet 12 and the supply passageway 74. A shut-off valve indicator switch 79 is provided for outputting a signal when communication between the inlet 12 and the passageway 74 is closed. A vent outlet 80 to aircraft cabin is provided in the supply passageway 74 and is arranged to be closed by the shut-off valve 78 when it is moved to a position in which the inlet 12 and supply passageway 74 are in communication.

A secondary inflation gas supply inlet passageway 81 from an inlet 82 communicates with the passageway 74 by way of the inlet 12 and the shut-off valve 78. The inlet 82 is adapted for connection with a source of pressurised gas, for example a pressurised air bottle, which is carried on the aircrew seat (not shown). The air bottle is automatically actuated when the aircrew member ejects from the aircraft to provide pressurised air for G-suit inflation to protect against altitude if this is in excess of 12000 meters as will hereinafter be described.

A vent valve member 83 carried by a diaphragm 84 is biased by a spring 85 towards opening a vent port 86 in the outlet 14 whereby G-suit inflation gas is vented to aircraft cabin by way of the vent port 86 and a secondary outlet 87.

A pressure reducing valve 88 carried by a diaphragm 89 maintains a stable supply pressure from the supply passageway 74 to a flow restrictor orifice 90 in a passageway 91 leading from the valve 88 in provision of a servo-flow for control purposes. The valve 88 is biased towards opening by the action of a spring 92.

Servo-control valve means comprises a torque motor 93 having a valve member 94 movable by the motor 93 between the position illustrated in FIG. 1, in which the servo-flow in the passageway 91 is vented to aircraft cabin by way of a passageway 95 and an outlet 96, and a position in which it closes the passageway 95 whereby a servo-pressure builds for control purposes. Servo-pressure is communicated by a passageway 97 and a chamber 98 to the reverse face of the diaphragm 71 from that face which projects the inflation gas supply valve member 70. Servo-pressure is further communicated by a branch passageway 99 to the reverse face of the diaphragm 84 from that face which projects the valve member 83.

A maximum pressure relief valve 100 provides for excess servo-pressure to vent to aircraft cabin via a secondary outlet 101.

Servo-flow is further communicated by a passageway 102 to a chamber 103. A solenoid operated valve member 104 having a valve head 105 located in the chamber 103 is biased by a spring 106 to connect the passageway 102 with the chamber 103. The chamber 103 is connected by an outlet port 107 with a secondary outlet 108 to aircraft cabin. A diaphragm valve member 109 is biased by a spring 110 and the action of control pressure in the breathing pressure control chamber 32, towards closing the connection between the outlet port 107 and the secondary outlet 108.

The torque motor 93 is connected for receiving servo-signals from an electronic control unit (ECU) 111 which will hereinafter be described in further detail. The ECU 111 is further connected for receiving signals from a pressure tranducer 112 sensing pressure in the outlet 14, and from the shut-off valve indicator switch 79. The ECU 111 is also connected by an electrical connector 113 for transmitting signals to and receiving signals from an aircraft utilities control system computer (not shown in FIG. 1), and for signalling the solenoid operated valve member 104 to close connection between passageway 102 and chamber 103.

During aircraft flight under conditions of high acceleration or exposure to high altitude (low cabin pressure), the torque motor 93 is signalled by the ECU 111 to move the valve member 94 towards closing with the outlet passageway 95 whereby servo-pressure builds. Servo-pressure is effective to move the valve member 83 towards closing the vent port 86 in the outlet 14. At the same time servo-pressure acts on the diaphragm 71 and is effective to overcome the biasing force of the spring 73 on the valve head 72 so that the valve member 70 is moved towards opening and pressurised air flows from the inlet 12 to the outlet 14 for inflation of a G-suit worn by the aircrew member. As pressure builds in the G-suit this is sensed on that face of the valve head 72 which faces the cup member 76 and when this pressure together with the biasing force of the spring 73 equals the force applied by the action of the servo-pressure on the area of the diaphragm 71, the valve member 70 moves towards a closing position to maintain G-suit inflation pressure at a constant value until servo-pressure changes.

As previously stated, it is a requirement that the G-suit be inflated to protect the aircrew member against the effect of low aircraft ambient pressure following ejection from the aircraft at altitudes in excess of 12000 meters when electrical power to the unit is lost.

In the unit 10 of the present invention this requirement is met by communicating servo-flow with the chamber 103. On loss of electrical power following ejection from the aircraft, the solenoid-operated valve member 104 is biased by the spring 106 to open connection between passageway 102 and chamber 103. At the same time, in the absence of electrical power, the torque motor 93 is biased so that valve member 94 is held in a position closing the passageway 95 to prevent servo-flow venting to ambient. Air for G-suit inflation and servo-flow requirements is supplied from the pressurised air bottle (not shown) connected to the inlet 82 as hereinbefore described. Oxygen for breathing following ejection is supplied to the breathing regulator 17 from an auxiliary oxygen bottle (not shown) and control pressure in the breathing pressure control chamber 32 is that set by the aneroid capsule 58. This control pressure is effective on the diaphragm valve member 109 and together with the biasing force of spring 110 regulates the servo-pressure in the G-suit inflation control means. This servo-pressure acts on the G-suit inflation gas supply valve 70 and the G-suit vent valve member 83 to cause the G-suit to be inflated to a pressure which is typically three to four times that of the pressure at the breathing gas outlet 13.

Thus the unit 10 continues to operate following ejection from the aircraft, to regulate supply of breathing gas (oxygen) to the aircrew member from an auxiliary oxygen bottle carried on the aircrew seat and to inflate the G-suit from the seat mounted pressurised air bottle for protection against exposure to altitude in excess of 12000 meters. At below about 12000 meters positive pressure breathing ceases to apply in the breathing regulator and the G-suit is hence depressurised.

A preferred method of controlling G-suit inflation pressure in an aircraft aircrew life support system including G-suit inflation control means having an active control element comprised by torque motor operated valve means which regulates a servo flow in obtainment of a servo-pressure that acts on a G-suit inflation gas supply valve and a G-suit inflation gas vent valve, will now be described with reference to FIGS. 2 and 3 of the accompanying drawings.

Figure 2:
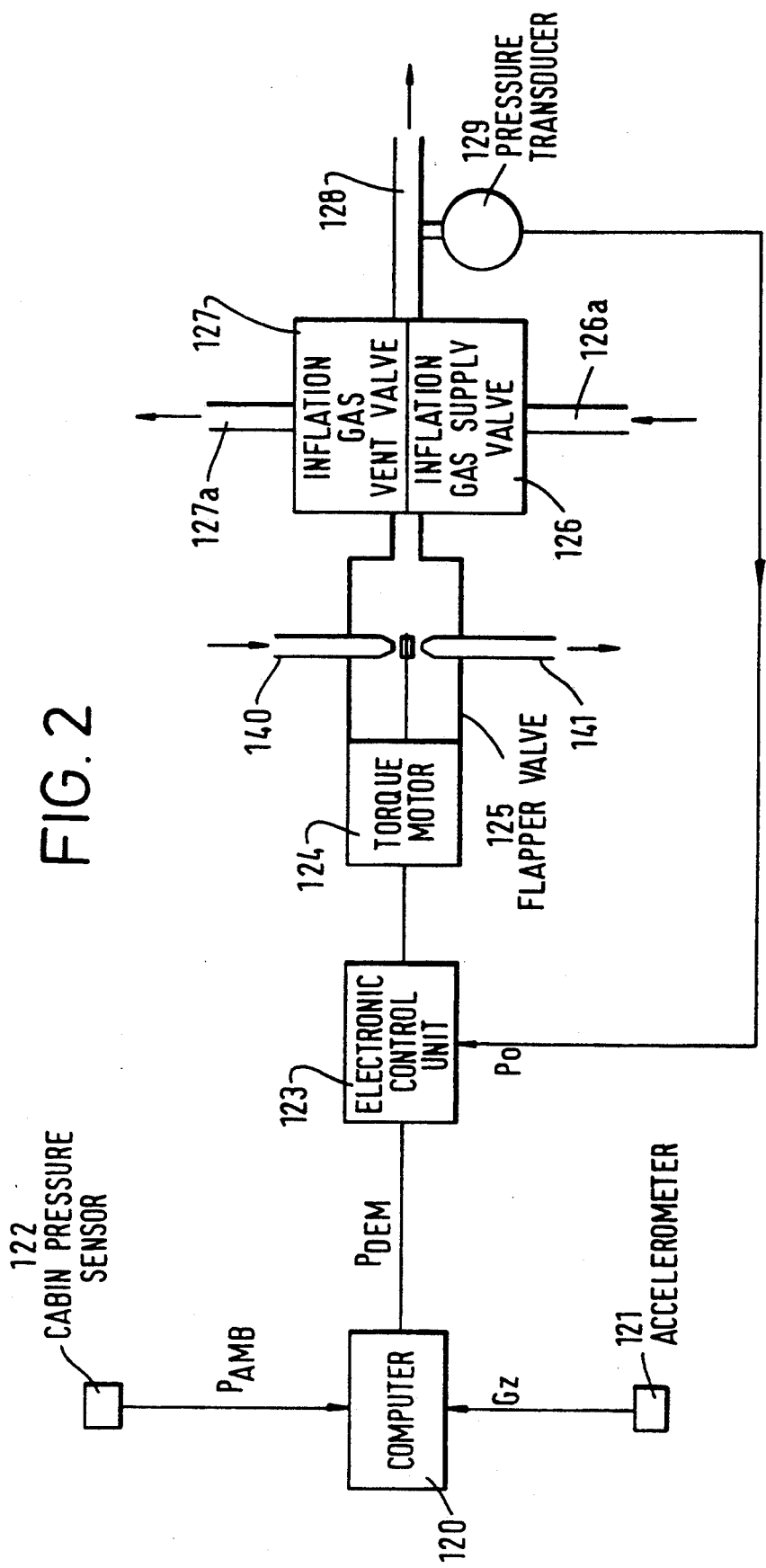
FIG. 2 is a schematic diagram of a preferred system for managing G-suit inflation control means forming part of the apparatus shown in FIG. 1.
Figure 3:
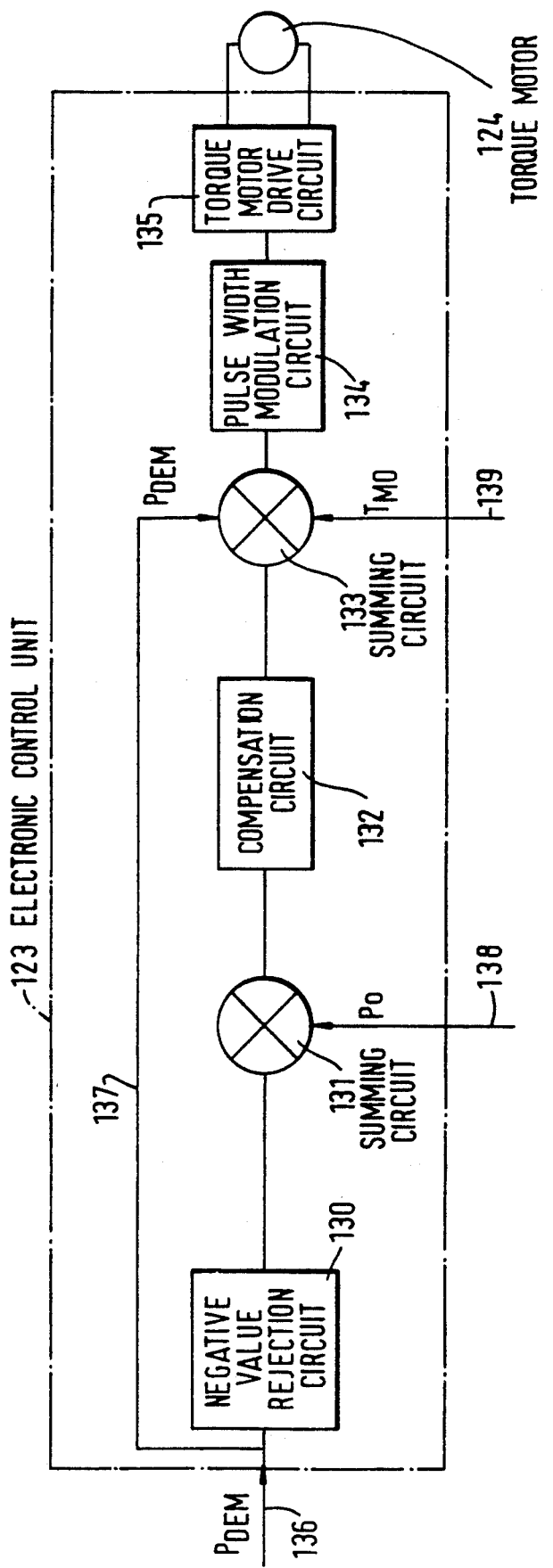
FIG. 3 is a schematic diagram of an electronic control unit forming part of the system shown in FIG. 2.

Referring first to FIG. 2, acceleration signals ($G_Z$) and cabin ambient pressure signals ($P_{AMB}$) are input to an aircraft on-board utilities control system computer 120. The $G_Z$ signals are representative of positive accelerations along the vertical axis of the aircraft as measured by one or more accelerometers 121 mounted on the aircraft fuselage. The $P_{AMB}$ signals are representative of pressure in the aircraft cabin as sensed by a pressure sensor 122. The computer 120 holds schedules of G-suit inflation pressure against both acceleration and cabin ambient pressure. On input of a $G_Z$ or a $P_{AMB}$ signal the computer looks up the appropriate G-suit inflation pressure and generates a G-suit pressure demand signal ($P_{DEM}$). The computer is programmed with control logic so that in the event of simultaneous input of $G_Z$ and $P_{AMB}$ signals, the higher of the pressure requirements for G-suit inflation is taken and an appropriate $P_{DEM}$ signal is generated.

The $P_{DEM}$ signal is output as an analogue signal which may be, for example, in the range 0.5 to 5.5 volts, where 5.5 volts corresponds to a G-suit pressure demand of 80 kPag. The $P_{DEM}$ signal is input to an electronic control unit (ECU) 123 which provides a position control system for G-suit inflation control means comprising a torque motor 124 controlling a flapper valve 125 which regulates a servo-flow to set a servo-pressure that acts to cause opening movement of a G-suit inflation gas supply valve 126 and closing movement of a G-suit inflation gas vent valve 127. The supply valve 126 controls a flow of inflation gas from a source (not shown) by way of an inlet 126a to an outlet 128 which is connected with an aircrew G-suit (not shown). The vent valve 127 controls venting of inflation gas from the G-suit to ambient by way of the outlet 128 and a vent outlet 127a. A pressure transducer 129 is connected into the outlet 128 for sensing pressure in the outlet, which pressure in steady state conditions will be that of the pressure existing internally of the G-suit and in fluid flow conditions will be substantially that existing internally of the G-suit. The pressure transducer 129 outputs a voltage signal which is input to the ECU 123 as a feedback signal to close the control loop.

The control function of the ECU 123 will now be described in greater detail with reference to FIG. 3.

The ECU 123 comprises the following basic circuits, a negative value rejection circuit 130, a first summing circuit 131, a compensation circuit 132, a second summing circuit 133, a pulse width modulation circuit 134 and a torque motor drive circuit 135. $P_{DEM}$ signals are input to the negative value rejection circuit 130 over a signal line 136 which connects at its opposite end with the computer 120 (not shown in FIG. 3). The function of the negative value rejection circuit 130 will be described hereinafter in more detail. $P_{DEM}$ signals are input also to the summing circuit 133 over signal line 137 which bypasses the negative value rejection circuit 130, the summing circuit 131 and the compensating circuit 132. Positive value $P_{DEM}$ signals are passed by the negative value rejection circuit 130 to the summing circuit 131 where they are summed with G-suit pressure feedback signals $P_O$ input over a signal line 138 which is connected at its opposite end with the pressure transducer 129 (not shown in FIG. 3). The summing circuit 131 outputs an error signal to the compensating circuit 132, this error signal being representative of the difference between the $P_{DEM}$ and $P_O$ signals. The circuit 132 compensates the error signal to enhance accuracy and stability, and outputs it to the summing circuit 133 where it is summed with the $P_{DEM}$ signal input over line 137 and with a torque motor offset signal ($T_{MO}$) input over a signal line 139. The summing circuit 133 outputs a servo-demand signal in the form of a torque motor drive voltage which is applied to the pulse width modulation circuit 134 for control of the torque motor drive circuit 135.

Figure 4:
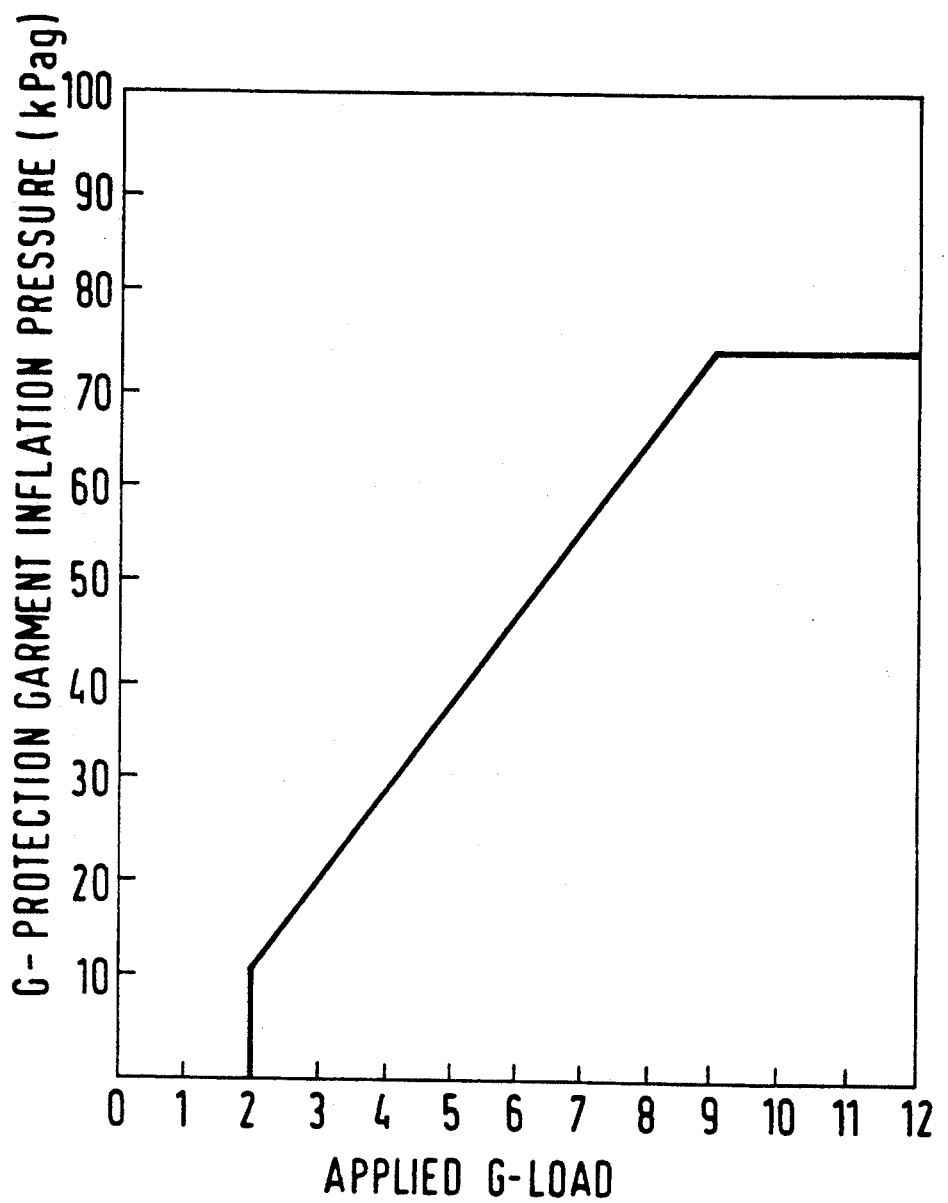
FIG. 4 is a graph showing desirable increases in G-suit inflation pressure with increasing G-load.

Referring again to FIG. 2, the torque motor 124 is driven by the drive circuit 135 to vary the position of the flapper valve 125 between a servo-flow supply nozzle 140 and an ambient vent nozzle 141 for regulation of servo-pressure acting on the inflation gas supply valve 126 and the inflation gas vent valve 127 whereby with increasing G-load the G-suit is inflated in accordance with the graph shown in FIG. 4.

For the comfort of the aircrew member when operating at G-levels below 2 G it is preferred that the G-suit be uninflated; however, in order to obtain immediate system response at 2 G it is desirable to prime the servo-system to a servo-pressure which is marginally below that required for operation of the inflation gas supply valve 126 and the vent valve 127. Thus, in flight conditions requiring zero G-suit inflation pressure, which may be a major part of a flight operation, the control process for the valves 126 and 127 carried out by the circuits 131 and 132 of the ECU 123 is rendered inactive. This is achieved by arranging that the computer under such circumstances demand a negative pressure. A negative value $P_{DEM}$ signal is rejected by the rejection circuit 130 and a zero signal is passed to the summing circuit 131 for comparison with the feedback signal $P_O$. However, the negative value $P_{DEM}$ signal is passed over line 137 to the circuit 133 where it is summed with the torque motor offset signal $T_{MO}$ in obtainment of a servo-signal that sets a servo-pressure which is marginally less than that required for commencement of control of the valves 126 and 127. By this means the servo-system is primed and held at a pressure below that at which hunting of the valves 126 and 127 would otherwise occur.

The torque motor offset signal $T_{MO}$ provides for operation of the torque motor on a preferred substantially straight line portion of its graph of torque motor current against servo-pressure.

This preferred control method and system makes the most appropriate utilisation of systems which are available on most modern day high performance aircraft in that an aircraft computer is used for a pre-processing task which is not computationally intensive and dedicated electronics at the G-suit inflation control apparatus are used to undertake the more intensive control task. This permits the dedicated electronics to be designed specifically for the control task, thus making performance of the torque motor controlled valve largely independent of computer loading and available update rates, and, at the same time, enables the electronics to be provided in an electronic control unit which is small enough to be packaged with the G-suit inflation control apparatus. Also, G-suit inflation schedules can be readily changed in software to meet differing aircraft requirements and particular aircraft operating roles, as well as permitting the inflation schedules to be optimised as more experience and better knowledge of preferred G-suit inflation pressures becomes available.

What is claimed is:

1. A method of controlling inflation pressure of an aircrew G-suit in protecting an aircrew member against G-load and against exposure to altitude above a predetermined level, comprising the steps of:

storing in an aircraft on-board systems computer a schedule of G-suit inflation pressure against increasing acceleration along a vertical axis of the aircraft and a schedule of G-suit inflation pressure against decreasing cabin ambient pressure; inputting to the computer signals representative of acceleration sensed along the vertical axis of the aircraft and signals representative of cabin ambient pressure;

looking up in the schedules and presenting requirements for G-suit inflation pressure;

determining by control logic programmed in the computer a higher one of values for G-suit inflation pressure in the vent of simultaneous acceleration and cabin ambient pressure signal inputs requiring inflation of the G-suit;

generating in the computer a G-suit inflation pressure demand signal;

transmitting the G-suit inflation pressure demand signal to an electronic control unit dedicated to control of G-suit inflation pressure;

sensing pressure existing in the G-suit or a pressure substantially corresponding thereto;

feeding back to the electronic control unit a signal representative of existing G-suit pressure;

comparing the existing G-suit pressure signal with the G-suit inflation pressure demand signal;

generating a compensated error signal;

combining the compensated error signal with the G-suit inflation pressure demand signal to provide a servo-demand signal;

transmitting the servo-demand signal to servo-control valve means for regulation of a servo-pressure which acts to close G-suit vent valve means adapted when open for communicating the interior of the G-suit with ambient and to open G-suit inflation gas supply valve means adapted for controlling delivery of inflation gas to the interior of the G-suit whereby the G-suit is inflated to a required pressure.

2. A method as claimed in claim 1, further comprising the step of generating negative value pressure demand signals in the computer at low levels of acceleration and transmitting the negative value pressure demand signals to the electronic control unit whereby the G-suit is not inflated until a predetermined G-level is exceeded.

3. An aircraft aircrew life support G-suit system comprising a breathing demand regulator means adapted to be connected with a breathing gas source for regulating supply of breathing gas to a breathing mask in response to breathing demands of an aircrew member, G-suit inflation control means comprising servo-control valve means for regulating a servo-pressure for control of a G-suit inflation gas supply valve means controlling flow of high pressure gas from high pressure gas inlet means for connecting said gas supply valve means with a source of said gas to high pressure gas outlet means for connecting said gas supply valve means with said G-suit and for control of a G-suit inflation gas vent valve means for venting high pressure gas from the G-suit to ambient; means for sensing acceleration along a vertical axis of said aircraft and for outputting signals representative thereof; means for sensing pressure internal of an aircraft cabin and for outputting signals representative thereof; an aircraft on-board systems computer means having a memory means storing schedules of G-suit inflation pressure against increasing acceleration along the aircraft vertical axis and against decreasing aircraft cabin pressure and connected for receiving signals from said acceleration sensing means and from said cabin pressure sensing means, said computer means being programmed to look-up in said schedules and present values of G-suit inflation pressure appropriate to sensed acceleration and cabin pressure and being further programmed with logic for determining a higher one of values for inflation pressure in the event of simultaneous acceleration and cabin pressure inputs requiring inflation of the G-suit, said computer means being adapted for generating a G-suit inflation pressure demand signal; an electronic control unit means connected for receiving said G-suit inflation pressure demand signal from said computer means; means for sensing pressure existing in said G-suit and connected for transmitting a feedback signal representative of existing G-suit pressure to said electronic control unit means; said electronic control unit means further including means for comparing said existing G-suit pressure signal with said demand signal, means for generating a compensated error signal, and means for combining said compensated error signal with said demand signal to provide a servo-demand signal; said electronic control unit means being connected for transmitting said servo-demand signal to said servo-control valve means for regulation of the servo-pressure whereby the G-suit inflation pressure is adjusted towards the required value.

4. A system as claimed in claim 3, wherein the system's computer means is programmed to output negative value demand signals at low levels of acceleration and the electronic control unit includes means for rejecting such signals so that the G-suit is not inflated until a predetermined G-level is exceeded.

5. A system as claimed in claim 4, wherein the electronic control unit comprises a negative value rejection circuit, a first summing circuit, a compensation circuit, a second summing circuit, a pulse width modulation circuit and a torque motor drive circuit.

6. A system as claimed in claim 5, wherein the negative value rejection circuit comprises negative value demand signal rejection means and positive value demand signal pass means the first summing circuit being connected for receiving positive value demand signals for summing with G-suit inflation pressure feedback signals in provision of an error signal.

7. A system as claimed in claim 6, wherein the electronic control unit further comprises means for allowing negative value demand signals to pass to the second summing circuit for summing with an offset signal in obtainment of a servo-demand signal that sets a servo-pressure of value marginally below that required for commencement of control of the G-suit inflation gas supply valve means and the G-suit inflation gas vent valve means.

8. A system as claimed in claim 3, wherein the breathing demand regulator means includes a breathing pressure control chamber for developing a control pressure therein which determines the breathing gas pressure delivered by the regulator means, the servo-control valve means comprises a torque motor-controlled valve means for regulating a servo-flow to provide servo-pressure which acts to move the G-suit vent valve means towards a closed position and the inflation gas supply valve means towards an open position whereby inflation gas flows from the high pressure gas inlet means to the high pressure gas outlet means, the torque motor-controlled valve means being biased in absence of electrical power to close a vent means communicating servo-flow with ambient, and a solenoid-operated valve means biased in absence of electrical power to a position communicating servo-flow with one side of a valve means adapted for sensing on its opposite side pressure in the breathing pressure control chamber whereby servo-pressure is regulated to set a G-suit inflation pressure that is a predetermined multiple of breathing gas delivery pressure.

* * * * *